(12) United States Patent
Kawasaki et al.

(10) Patent No.: US 7,111,088 B2
(45) Date of Patent: Sep. 19, 2006

(54) COMPUTER SYSTEM, MANAGEMENT DEVICE, AND LOGICAL DEVICE SELECTING METHOD AND PROGRAM

(75) Inventors: Naoto Kawasaki, Yokohama (JP); Yasufumi Uchiyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 10/875,210

(22) Filed: Jun. 25, 2004

(65) Prior Publication Data

US 2005/0108477 A1    May 19, 2005

(30) Foreign Application Priority Data

Nov. 18, 2003    (JP)    ............................. 2003-387846

(51) Int. Cl.
*G06F 3/00*    (2006.01)
(52) U.S. Cl. .............. 710/38; 710/5; 710/36; 711/6
(58) Field of Classification Search ..................... None
See application file for complete search history.

(56) References Cited

U.S. PATENT DOCUMENTS

| | | | |
|---|---|---|---|
| 5,584,018 A | 12/1996 | Kamiyama | |
| 5,893,139 A | 4/1999 | Kamiyama | |
| 6,173,362 B1 | 1/2001 | Yoda | |
| 6,216,202 B1* | 4/2001 | D'Errico | ..................... 711/112 |
| 6,708,265 B1 | 3/2004 | Black | |
| 6,738,839 B1 | 5/2004 | Sinha | |
| 6,832,272 B1* | 12/2004 | Hirakawa et al. | .............. 710/36 |
| 6,886,054 B1 | 4/2005 | Taninaka et al. | |
| 6,895,483 B1 | 5/2005 | Eguchi et al. | |
| 6,931,440 B1* | 8/2005 | Blumenau et al. | ........... 709/220 |
| 2002/0099908 A1 | 7/2002 | Yamamoto et al. | |
| 2002/0103969 A1 | 8/2002 | Koizumi et al. | |
| 2004/0088417 A1* | 5/2004 | Bober et al. | ................. 709/227 |
| 2004/0225764 A1* | 11/2004 | Pooni et al. | ................... 710/38 |
| 2004/0230787 A1* | 11/2004 | Blumenau et al. | .............. 713/1 |

FOREIGN PATENT DOCUMENTS

JP    11-095934    4/1999

* cited by examiner

*Primary Examiner*—Fritz Fleming
*Assistant Examiner*—Niketa Patel
(74) *Attorney, Agent, or Firm*—Mattingly, Stanger, Malur & Brundidge, P.C.

(57) ABSTRACT

To provide an computer system including a storage system that includes a logical device logically set in a physical device, an host computer that requests the storage system for a data input/output, and a management device that manages information of components of the storage system, the host computer requesting a data input/output via a logical path serving as a communication paths with the logical device and, the some of the host computer restricted to send the data input/output request to the logical device, wherein the management device includes an information acquisition module that acquires the information of the components in the storage system, and a judging module that selects a logical device to move based on a number of logical paths set on the logical devices and a number of communication counterpart devices set through effective logical paths in the information acquired by the information acquisition module.

23 Claims, 9 Drawing Sheets

FIG.4

| JUDGING CONDITION | ADDING/SUBTRACTING POINT COUNT |
|---|---|
| PATH SET IN LDEV | +2 |
| WWN SET IN LDEV | −1 |

ADDING POINT COUNT TABLE  400

FIG.5

| i | LDEV | NUMBER OF PATH | NUMBER OF WWN | LDEV POINT | MOVING TARGET | ARRAY GROUP POINT | LDEV TO MOVE |
|---|------|----------------|---------------|------------|---------------|-------------------|--------------|
| 0 | 0:01 | 0  | 0 | 0  | × | 2  | × |
| 1 | 0:02 | 1  | 0 | 2  | × |    |   |
| 2 | 1:01 | 4  | 0 | 4  | × | 17 | × |
| 3 | 1:02 | 10 | 7 | 13 | ○ |    |   |
| 4 | 2:01 | 1  | 0 | 2  | × | 19 | ○ |
| 5 | 2:02 | 4  | 3 | 5  | × |    |   |
| 6 | 2:03 | 10 | 8 | 12 | × |    |   |

LDEV SELECTION JUDGING TABLE 500

COMPUTER SYSTEM, MANAGEMENT DEVICE, AND LOGICAL DEVICE SELECTING METHOD AND PROGRAM

CLAIM OF PRIORITY

The present application claims priority from Japanese application P2003-387846 filed on Nov. 18, 2003, the content of which is hereby incorporated by reference into this application.

BACKGROUND OF THE INVENTION

The present invention relates generally to an computer system including array type storage systems, and more particularly to an computer system that selects a logical device to be moved to an other array group from among logical devices set in the storage systems and to an computer system that selects a logical device in which a path is set afresh.

There has hitherto been widely utilized a capacity-increased disk array device by loading a single storage system with plural disk drives (physical devices). Therefore, a general practice is not that a single server occupies one storage system but that plural servers share one storage system with each other in a network (e.g., Storage Area Network (SAN)) for the use of the storage systems.

There was proposed a method of improving an input/output performance of the plural logical devices set on the physical devices by equalizing loads of disk array devices having this type of plural disk drives. Specifically, an computer system has plural array groups including plural physical devices, wherein the plural logical devices are set in each of the array groups. Proposed in this type of computer system is a technology (refer to JP 11-95934 A) of equalizing the loads of the physical devices by storing a result of observing an input/output request accepting frequency with respect to every array group, every logical devices, and every physical device in a table provided in a control information memory within a control device, and replacing, with each other, the logical devices belonging to different array groups and having different input/output request accepting frequencies.

SUMMARY OF THE INVENTION

According to the prior art described above, but a layout of the logical devices did not take the performance of the physical devices into consideration. Therefore, the logical device layout in the storage system could not be optimized, and the loads could not be properly distributed.

According to one embodiment, there is provided an computer system by way of one embodiment, which enables a data input/output process to be efficiently executed by properly laying out logical devices in consideration of a performance of a storage system, balancing loads through proper path setting, and reducing data input/output processing time.

According to another embodiment, there is provided a computer system including a storage system that includes a logical device logically set in a physical device, a host computer that requests the storage system for a data input/output, and a management device that manages structure information of components in the storage system, where in the host computer requests a data input/output via a logical path as a communication paths with the logical device, at least one of the host computers is restricted to send the data input/output request to the logical device, and the management device includes an information acquisition module that acquires the information of the components in the storage system, and a judging module that selects a logical device to move based on a number of logical paths set on the logical devices and a number of communication counterpart devices set through effective logical paths in the information acquired by the information acquisition module.

A free area for the physical devices can be effectively utilized by moving the selected logical device to a high-performance physical device. Further, the physical device and the path can be optimized by setting the path in the selected logical device, whereby loads of the physical devices can be properly distributed.

BRIEF DESCRIPTION OF THE DRAWINGS

The present invention can be appreciated by the description, which follows in conjunction with the following figures, wherein:

FIG. 4 is an explanatory diagram of an adding point count table according to the embodiment.

FIG. 5 is an explanatory diagram of an LDEV selection judging table according to the embodiment.

DETAILED DESCRIPTION OF THE PREFERRED EMBODIMENTS

Figure 1:
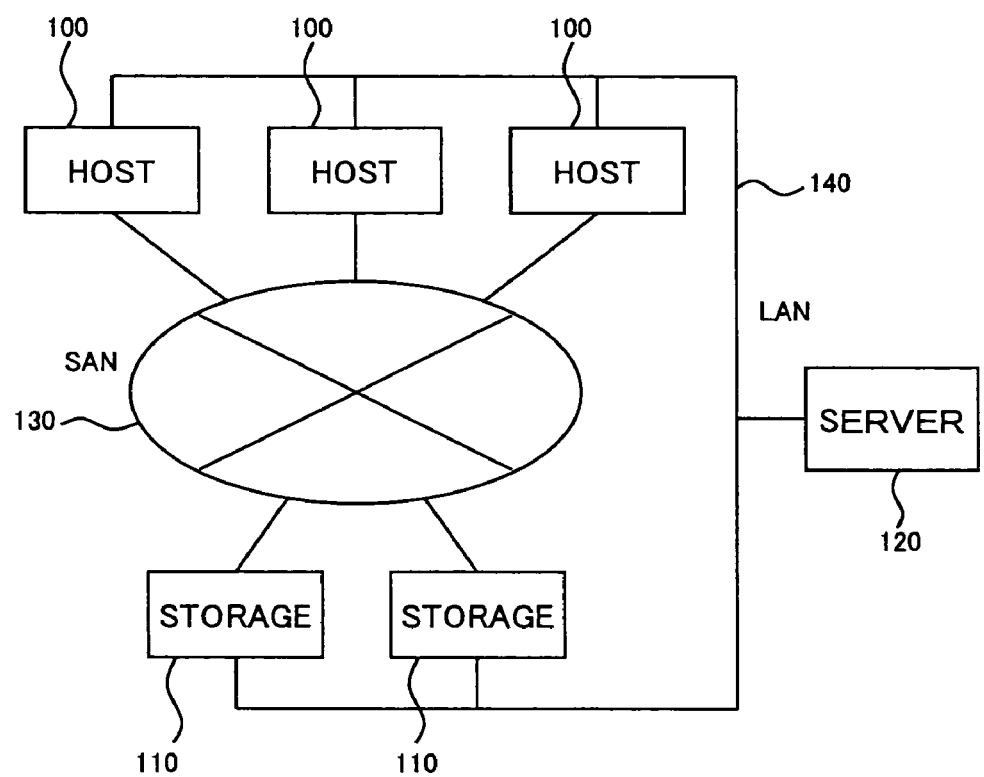
FIG. 1 is a block diagram showing a whole architecture of an computer system according to an embodiment.

FIG. 1 is a block diagram showing a whole architecture of an computer system according to this embodiment.

The computer system includes at least a host computer 100, at least a storage system 110, and at least a management server 120. It should be noted that FIG. 1 shows the computer system including three host computers 100, two storage systems 110, and one management server 120, but an computer system having other numbers of host computers 100, storage systems 110, and management servers 120, is also available.

The storage systems 110 are connected via a network (e.g., Storage Area Network (SAN)) 130 to the host computers 100. Communications between the host computers 100 and the storage systems 110 via the SAN are performed based on Fibre Channel Protocol (FCP). That is, the host computer 100 sends a data access request on a block-by-block basis to the storage system 110 on the basis of the FCP.

Further, the host computers 100 are connected via a network (e.g., Local Area Network (LAN)) 140 to the management server 120 and further to the storage systems 110.

The management server 120 communicates with the host computers 100 and the storage systems 110, thus managing structure information of the storage systems 110, monitoring operating conditions (a fault or the like) of disk controllers or the like, within the storage systems 110, and gathering pieces of information such as load information of the data access in the disk controllers or the like, information about activity ratios of cache memories, and so on.

Figure 2:
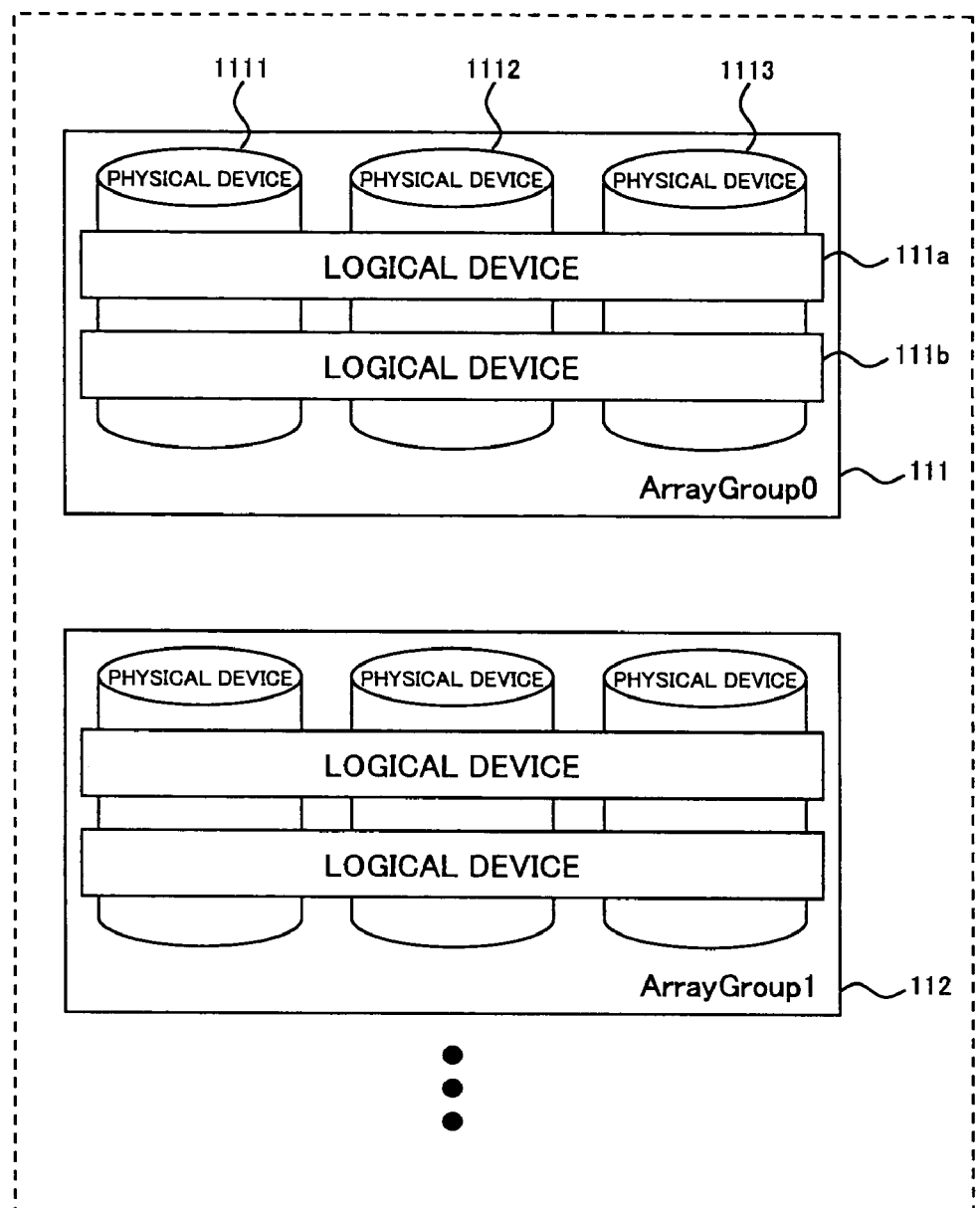
FIG. 2 is a conceptual diagram of an array group organized in a storage system according to the embodiment.

FIG. 2 is a conceptual diagram of an array group organized in the storage system 110.

The storage system 110 is provided with plural physical devices 1111 to 1113 that structure an array group 111 or the like The physical devices 1111 through 1113 within the array group 111 organize a Redundant Arrays of Inexpensive Disks (RAID) configuration, and the data are stored on the plural physical devices.

In the array group, the physical devices are segmented into plural request destination logical devices (LDEV) 111a and 111b to which a data input/output request is given from the host computer 100, wherein the logical devices are defined as logical regions in terms of control. These segmented areas are integrated across the plural physical devices, thereby configuring the plurality of request destination logical devices (a logical volume) to which the data input/output request is given from the host computer 100. That is, the logical devices are defined as storage areas into which storage resources (the physical devices) provided by the host computer 100 are logically set. The storage resources can involve using a variety of storage media such as flexible disk drives, semiconductor storage system or the like in addition to hard disk drives.

When a data input/output (write or read) to or from the logical device occurs due to a command given from the host computer 100, the storage system 110 executes an input/output process to the physical device in which the area stored with the data to input or to output exists.

The thus-defined logical device is assigned a unique logical device identifier, the physical device is assigned a unique physical device identifier, and the array group is assigned a unique array group identifier.

Communication paths (logical paths) to the host computer 100 are set among the logical devices provided in the each array groups. The host computer 100 accesses the data stored on the storage systems 110 via these logical paths. The logical path is set on a physical path defined as a data transfer path that is physically structured by hardware (fibre channel switches or the like) establishing connections between the host computer 100 and the storage systems 110.

Further, security information that permits only the communications with the specified host computer 100 is set in each logical device. Based on the security information, when, e.g., the fibre channel protocol (FCP) is utilized, specified ports are organized into groups by use of unique identifiers (World Wide Name (WWN)) assigned to ports of the host computer 100 and of the storage systems 110, thus creating a zone. This scheme is that only a packet transfer within the zone is permitted through the fibre channel switch that connects the host computer 100 to the storage systems 110, and neither a packet transfer from other zones nor a packet transfer to other zones is permitted, thereby actualizing exclusive access control.

It should be noted that the physical devices are allocated to every array group in FIG. 2, but a possible architecture is that plural array groups coexist on the single physical device (i.e., the plural array groups share the single physical device with one another).

Figure 3:
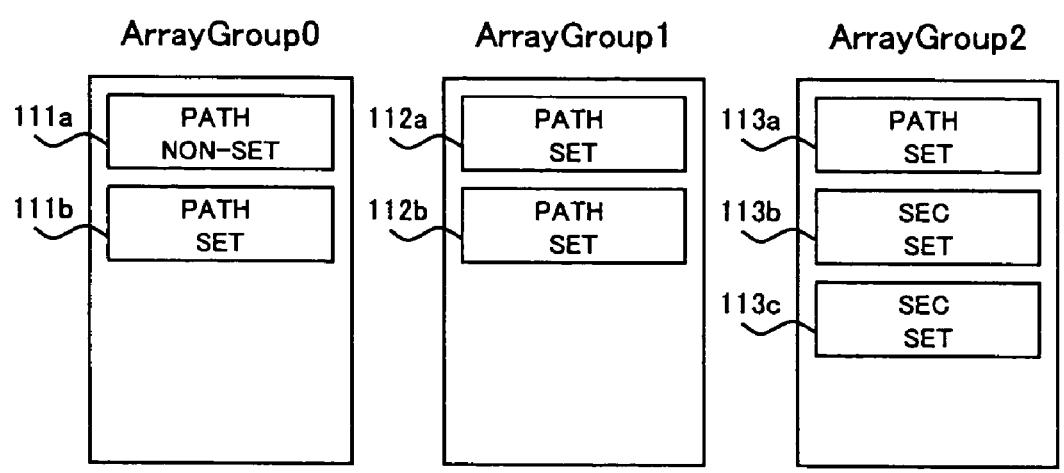
FIG. 3 is a conceptual diagram of logical devices structured in the array group according to the embodiment.

FIG. 3 is a conceptual diagram of the logical devices structured in the array group.

An array group 0 is provided with the logical device 111a. The logical path is not set on the logical device 111a, and therefore the logical device 111a is substantially not in use. Further, the logical path is set on the area (logical device) 111b provided in the array group 0, while the security information (the port of the specified host computer can communicate counterpart device) is not set on the logical device 111b.

The array group 1 is provided with logical devices 112a and 112b. The logical paths are set on the logical devices 112a and 112b, but the security information is not set therein.

The array group 2 is provided with logical devices 113a, 113b, and 113c. The logical path is set on the logical device 113a, while the security information is not set therein. The logical paths are set on the logical devices 113b and 113c, and the security information is also set therein. That is, said zone contains a port provided in a host bus adapter (HBA) taking charge of the data input/output process to or from the logical devices 113b and 113c. Therefore, at least one of the logical paths set on the logical devices 113b and 113c is restricted the host computer as the communication counterpart device, thereby attaining the exclusive access control.

When the logical path is set on the logical device, it is understood that the access to the logical device increases in relation to the number of the logical paths. Moreover, when the security information is set on the logical path, the access to the logical device is permitted within a restricted range. A frequency of using the logical device is estimated based on the number of the logical paths set on the logical device and on the number of the logical paths in which the security information is set. Then, the logical devices are moved to the physical devices (array group) having a different performance, thereby enabling a performance of the whole of the storage systems to be improved by optimizing a layout of the logical devices.

FIG. 4 shows an adding point table used when creating an LDEV selection judging table (FIG. 5).

A judging condition 401 and an adding/subtracting point 402 associated with the judging condition 401 are specified in an adding point count table 400.

Specifically, two points are added (+2) when the logical path is set on the logical device (LDEV). This implies that there occurs an access to the logical device from the host computer 100 via the set logical path, and therefore the usage frequency of the logical device becomes higher as the number of the logical path set on the logical device gets larger. Therefore, the points for the logical device (or the array group) is increased by numbers of logical path×2, in order to raise the priority when selecting the logical device to move.

Further, when the security information is set on the logical path (when, e.g., WWN of the communication counterpart device is set), one point is decreased. This implies that the host computer 100 accessible to the logical device is limited by setting the security information, and therefore the usage frequency of the logical device does not become so high. Accordingly, the points for the logical device (or the array group) is decreased by a value given by (number of WWN× 1) after adding the value given by (number of logical path×2) so that the priority in the case of selecting the logical device to move does not become so high.

FIG. 5 shows an LDEV selection judging table utilized when selecting the logical device to move.

An LDEV selection judging table 500 includes an entry number 501, a logical device number 502, a number of logical path 503, a number of WWN 504, a point of the logical device 505, a judgment result 506 showing whether the logical device is an object to move, an array group point 507, and a judgment result 508 showing whether the array group is an object to move.

The entry number 501 is a number for identifying the logical device written in the LDEV selection judging table 500. For instance, the entry numbers stating from "0" can be set in the sequence of obtaining the logical device information.

The number of the logical device (LDEV) 502 is information by which the logical device and the array group to which this logical device belongs can be identified. For example, according to this embodiment, the logical device number 502 is defined in a form such as [0:01], wherein [01] posterior to [:] represents an identifier of the logical device, and [0] anterior to [:] represents an identifier of the array group to which this logical device belongs.

The number of the logical path 503 is the number of the logical paths set on the logical device (the number of communication paths to the ports of the host computers 100) The number of the WWN 504 is the number of the ports of the host computers 100 set accessible to the logical device.

The point of the logical device (LDEV point) 505 is calculated based on the number of the logical path 503 and on the WWN count 504. More specifically, a value obtained by decreasing (number of logical path×1) with WWN set in the logical device from (number of logical path×2) set in the logical device, is set as the LDEV point.

The judging result 506 showing whether the logical device is the object to move, is information by which the logical device to move can be identified. A judgment whether the logical device is the object to move is made by estimating the usage frequency of the logical device on the basis of the LDEV point 505. For example, in the case shown in FIG. 5, the logical device having the logical device number [1:02] exhibits the highest LDEV point and is, this device being presumed high of its usage frequency, therefore selected as a candidate to be moved to a high-performance array group. That is, if the logical device exhibiting the high usage frequency exists in a slow-response array group, this logical device is selected as a candidate to be moved to a quick-response array group. It should be noted that the logical device exhibiting a low LDEV point is presumed low of its usage frequency and may therefore be selected as a candidate to be moved to a low-performance array group.

The array group point 507 is calculated based on the number of the logical path 503 and on the number of the WWN 504. To be specific, a value obtained by decreasing (number of logical path×1) with WWN set in the logical device within the array group from (number of logical path×2) set in the logical device within the array group, is set as the array group point. That is, the array group point 507 is a sum of the LDEV points of the logical devices within the array group.

The judging result 508 showing whether the array group is the object to move, describes information by which the array group to move can be identified. The movement of the array group is judged by estimating the usage frequency of the array group on the basis of the LDEV point 505. For instance, in the case shown in FIG. 5, the array group having the array group number "2" exhibits the highest array group point and is, this array group being presumed high of its usage frequency, therefore selected as a candidate to be moved to a high-performance array group (which means that the logical devices within this candidate array group are moved on an array-group-by-array-group basis). That is, if a response of the array group showing a high usage frequency is poor, this array group is selected as a candidate to be moved to a good-response array group. It should be noted that the array group exhibiting a low array group point is presumed low of its usage frequency and may therefore be selected as a candidate to be moved to a poor-performance array group.

Figure 6:
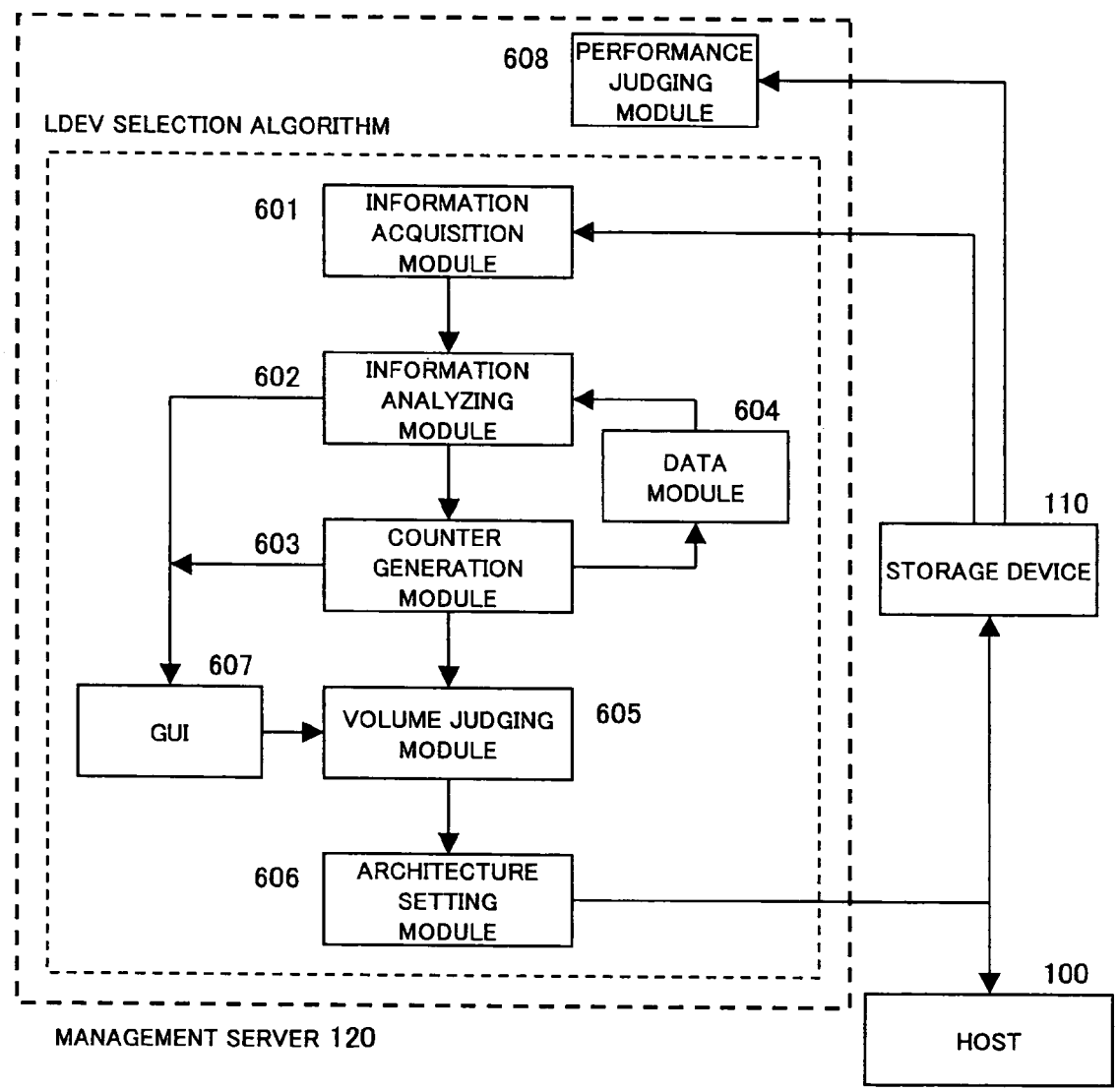
FIG. 6 is a function block diagram of a management server 120 according to the embodiment.

FIG. 6 is a function block diagram of the management server 120.

An information acquisition module 601 acquires pieces of information about a storage system architecture, a setting state, and an operating condition from the storage system 110.

An information analyzing module 602 analyzes pieces of information about the number of the logical path 503 and the number of the WWN 504 from the information acquired from the storage system 110 by the information acquisition module 601.

A counter generation module 603 calculates a point of the logical device (LDEV point) by use of the number of the logical path 503 and the number of the WWN 504 of which the information has been analyzed by the information analyzing module 602. The information analyzing module 602 and the counter generation module 603 output information to a Graphical User Interface (GUI) module 607. This information is displayed as recognizable to an operator of the management server. That is, the GUI module 607 functions as an information output unit for outputting the analysis result of the information acquired from the information analyzing module 602 and the point of the logical device based on this analysis result.

The LDEV point calculated by the counter analyzing module 603. The LDEV point is described in the LDEV selection judging table (FIG. 5) and is stored on a data module 604. The information analyzing module 602 refers to the LDEV selection judging table stored on the data module 604, and the LDEV selection judging table is used when the information analyzing module 602 analyzes the information about the number of the logical path 503 and the number of the WWN 504 from the information acquired from the storage system 110.

A volume judging module 605 selects the logical device exhibiting the high usage frequency as a device to move by use of the LDEV point calculated by the counter analyzing module 603. It should be noted that an administrator may also designate the logical device to move by referring to the information displayed by the GUI module 607.

An architecture setting module 606 sets the logical path in the logical device. For instance, the architecture setting module 606 sets the path between the logical device and the host computer 100 so that the logical device moved to another array group becomes movable in the same way as before moving.

A performance judging module 608 judges a performance of every array group by monitoring the operating condition of the storage system 110. For example, the performance judging module 608 calculates a period of time till an I/O process terminating notification is given since an I/O request (data input/output request) has been made, and obtains a response time of the array group, thereby judging the performance of the array group. The performance judging module 608 thus specifies the poor- or good-performance array group.

Figure 7:
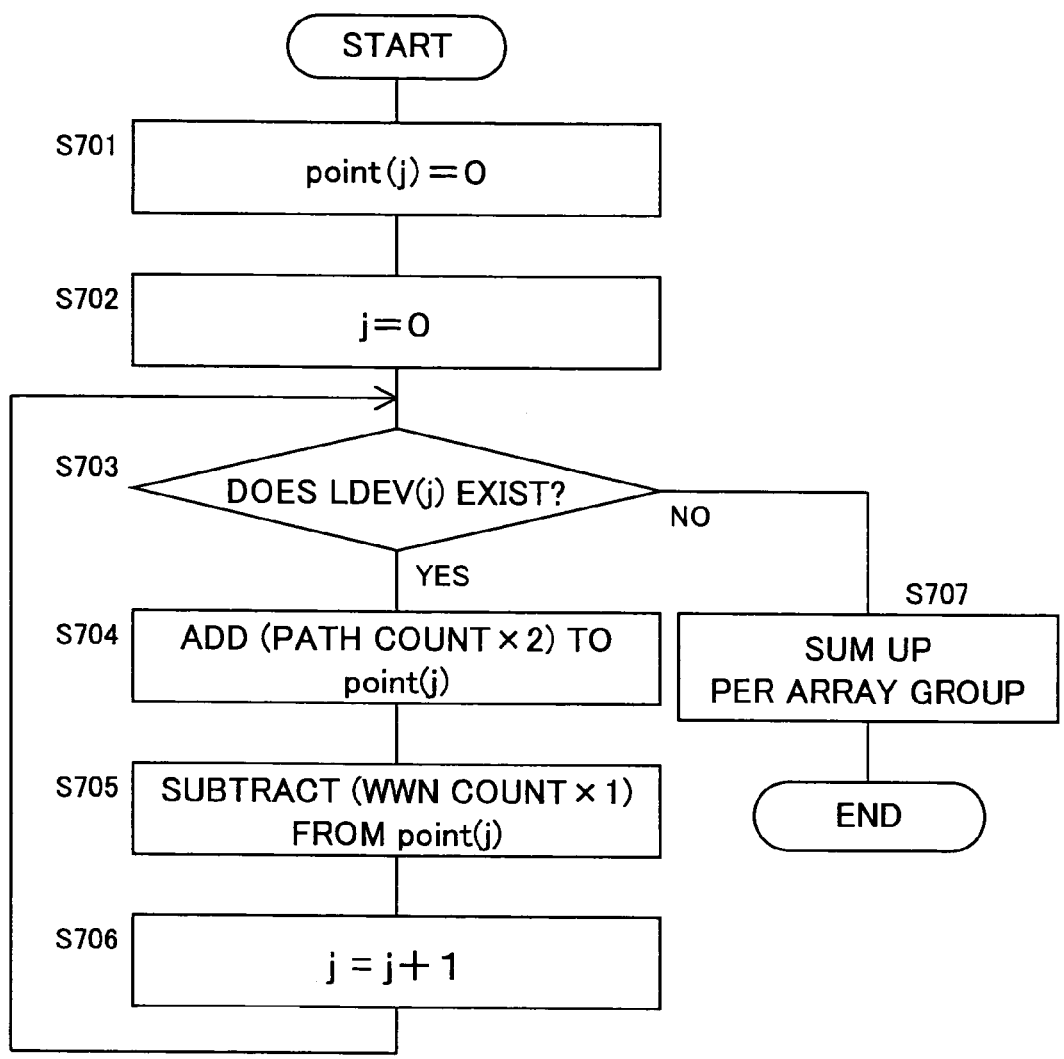
FIG. 7 is a flowchart of an LDEV point calculating process according to the embodiment.

FIG. 7 is a flowchart of an LDEV point calculating process involving the use of the information about the number of the logical path 503 and the number of the WWN 504, wherein this calculating process is executed by the counter generation module 603.

To start with, the counter generation module 603 sets, to "0", point(j) (j=0 through n (n is the maximum value of the entry number 501) defined as the LDEV point of each logical device (S701), and performs initialization for setting a counter value j to the minimum value "0" of the entry number 501 (S702).

Then, the counter generation module 603 judges whether a j-th logical device (LDEVU)) exists (S703).

If the j-th logical device (LDEVU)) exists, the counter generation module 603 adds a value obtained by multiplying the number of the logical path 503 set on the logical device by "2", to the LDEV point (point(j)) for the logical device (S704). Then, the counter generation module 603 subtracts a value obtained by multiplying the number of the WWN 504 of the logical device (which is the number of the logical paths in which the number of the WWN of the communication counterpart device is set) by "1" from the LDEV point (point(j)) of the logical device (S705).

Thereafter, the counter generation module 603 adds "1" to the counter value j in order to calculate the LDEV point of a subsequent (j+1)th logical device (S706), and returns to step S703.

Finally, if the j-th logical device (LDEV(j)) does not exist, this implies that the calculations of the LDEV points 505 of all the logical devices have been finished, and therefore the counter generation module 603 refers to the LDEV selection judging table (FIG. 5) and thus specifies which array group the logical device belongs to. Then, the counter generation module 603 sums up, for every array group, the LDEV points 505 calculated on a logical-device-by-logical-device basis, and thus obtains the array group point 507 (S707), and this process comes to an end.

Figure 8:
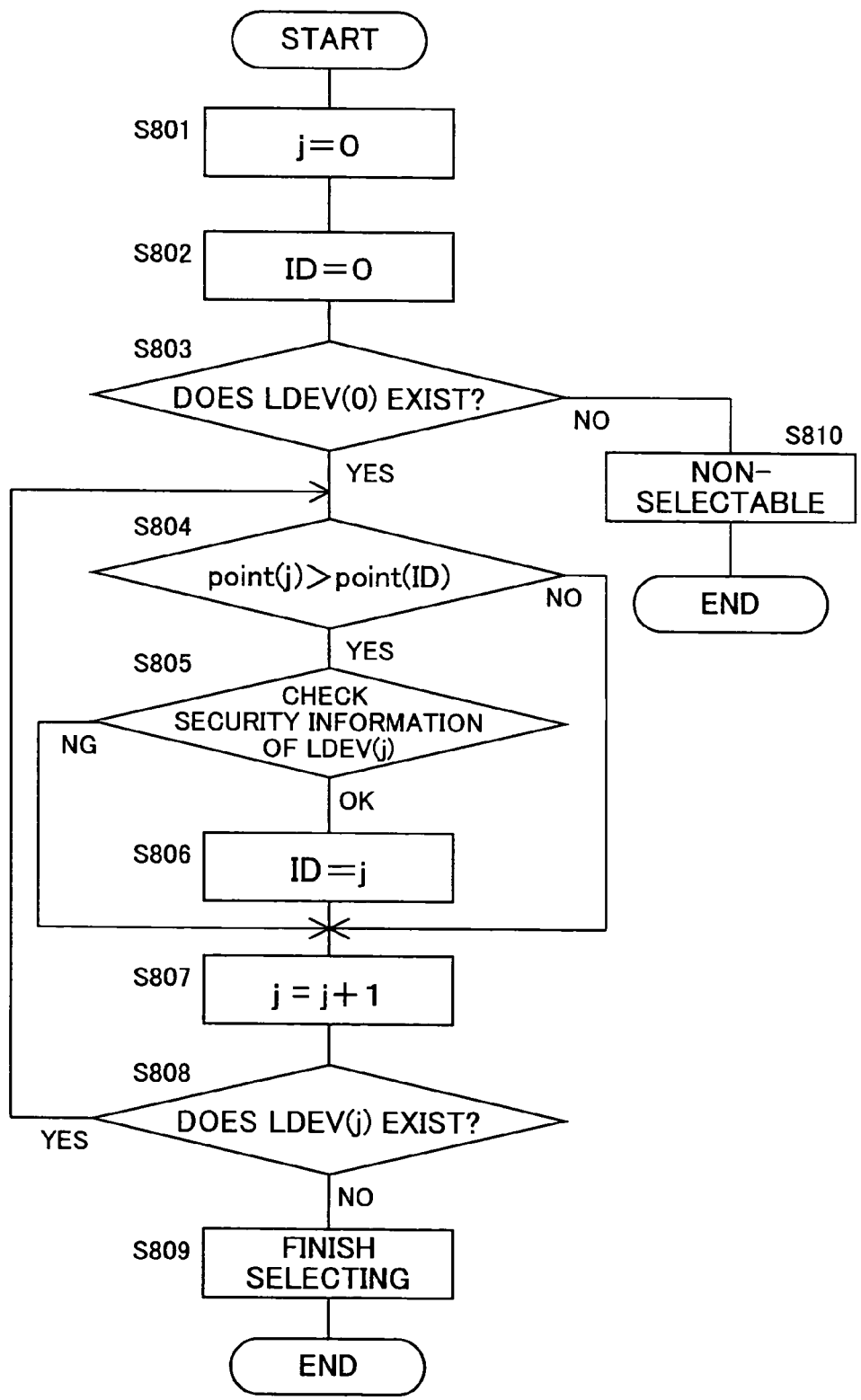
FIG. 8 is a flowchart of a process of selecting a moving logical device according to the embodiment.

FIG. 8 is a flowchart of a process of selecting the logical device to move. The volume judging module 605 executes this process by referring to the LDEV selection judging table (FIG. 5).

To begin with, the volume judging module 605 sets the counter value j to the minimum value "0" of the entry number 501 (S801), and executes initialization for setting an ID given the maximum value of the LDEV point to "0" (S802).

Then, the volume judging module 605 judges whether a first logical device (LDEV(0)) exists (S803).

If the first logical device (LDEV(0)) does not exist, the volume judging module 605 is unable to select the logical device to move (S810) and therefore terminates this process. On the other hand, if the first logical device (LDEV(0)) exists, the volume judging module 605 advances to step S804, and starts a process of selecting the logical device to move.

In step S804, the volume judging module 605 compares the LDEV point (point(j)) of the j-th logical device with the maximum value (point(ID)) of the LDEV point at the present time. Then, if the LDEV point (point(j)) of the j-th logical device is larger than the maximum value (point(ID)) of the LDEV point at the present time (points(j)>point(ID)), the volume judging module 605 judges that point(j) is the new maximum value of the LDEV point.

It should be noted that when the LDEV point of the plural logical devices are equal to one another, the logical device having the smaller entry number (which is the logical device selected earlier) is selected in step S804 described above, but it can also be judged otherwise based on the number of the logical devices set in the array group. For example, two logical devices are set in the array group 1, three logical devices are set in the array group 2, and the LDEV points of the logical devices in the array group 1 are equal to the LDEV points of the logical devices in the array group 2. In this case, the larger number of logical devices set in the array group 1 are preferentially selected. Incidentally, a possible scheme is that the number of the logical devices set in the array group and the selection order of the logical devices are used in combination, the LDEV points are equal to one another, and the logical device counts of the logical devices organized in the array groups are the same, in which case the logical device discovered earliest is to be selected.

Moreover, the judgment can be made by using the array group points in combination. For instance, when the LDEV points of the logical devices set in the array group 1 are equal to the LDEV points of the logical devices set in the array group 2, the logical devices set in the array group having the larger points are selected. Next, the volume judging module 605 checks the security information of LDEV(j) (S805). To be specific, the volume judging module 605 compares the security information set in the port taking charge of the data input/output process to the j-th logical device with the security information set in the port taking charge of the data input/output process to the concerned logical device in the array group to which the logical device is to be moved, and checks the security information, depending on whether the necessary logical path can be set even after moving the logical device.

If it is judged as a result of checking the security information that this logical device may be moved, the volume judging module 605 sets the entry number j of the logical device given this LDEV point to "ID", and updates the logical device number of the logical device given the maximum value of the LDEV point (S806). On the other hand, if it is judged as the result of checking the security information that the above logical device cannot be moved, the volume judging module 605 advances to step S807 without updating the logical device number of the logical device given the maximum value of the LDEV point.

It should be noted that the security information may be checked with respect to the logical device serving as a candidate for having the maximum value of the LDEV point, but the security information about all the logical devices is previously checked, and the logical device given the maximum value of the LDEV point may also be selected from among the logical devices eligible for the object to move.

Further, the logical device to move may be selected without checking the security information, and the security information (which corresponds to the port of the specified host computer eligible for the communication counterpart device) may be set after moving the logical device.

Thereafter, the volume judging module 605 adds "1" to the counter value j in order to judge whether a subsequent (j+1)th logical device is the object to move (S807). Then, the volume judging module 605 judges whether the j-th logical device (LDEV(j)) exists (S808).

If the j-th logical device (LDEV(j)) exists, the volume judging module 605 returns to step S804, and repeats this process. On the other hand, if the j-th logical device (LDEV (j)) does not exist, this implies that the object to move selecting process about all the logical devices has been finished (S809), and therefore the volume judging module 605 terminates this process.

Given next is an embodiment of an example to which the aforementioned logical device selecting process is applied in the case of selecting the storage system 110 (the logical device) in which the management server 120 sets the path when accepting a new path creation request.

At first, the volume judging module 605 initializes the counter value j and the ID given the minimum value of the LDEV point (S801 and S802). Then, the volume judging module 605 judges whether the first logical device (LDEV (0)) exists (S803).

In step S804, the volume judging module 605 compares the LDEV point (point(j)) of the j-th logical device with the minimum value (point(ID)) of the LDEV point at the present time. Then, if the LDEV point (point(j)) of the j-th logical device is smaller than the minimum value of the LDEV point at the present time (point(j)<point(ID)), the volume judging module 605 judges that point(j) is the new minimum value of the LDEV point.

Thereafter, as in the logical device to move selecting process (FIG. 8) described above, the security information of the logical device LDEV(j) is checked (S805). The volume judging module 605, when the path may be set in this logical device, sets the entry number j of the logical device given this LDEV point to "ID", and updates the logical device number of the logical device given the minimum value of the LDEV point (S806). On the other hand, the volume judging module 605, when the security information that the path cannot be set in that logical device, goes to step S807 without updating the logical device number of the logical device given the minimum value of the LDEV point.

Thereafter, the volume judging module 605 adds "1" to the counter value j in order to judge whether the path can be set in a subsequent (j+1)th logical device (S807), and judges whether the j-th logical device (LDEV(j)) exists (S808).

The volume judging module 605, if the j-th logical device (LDEV(j)) exists, returns to step S804, and repeats this process. On the other hand, if the j-th logical device (LDEV (j)) does not exist, this implies that the judgment about whether the path can be set in every logical device has been finished (S809), and therefore the volume judging module 605 terminates this process.

As described above, in the case of selecting the logical path in which the path is set, unlike the logical device to move selecting process (FIG. 8) described above, the logical device given the minimum value of the LDEV point is selected.

In the discussion made so far, the process of selecting the logical device to set the path has been explained, but an array group to set the path can also be selected by use of the point calculated for the array group.

Further, when the LDEV points of the plural logical devices are equal to each other, the array group to set the path can also be selected by using the point of the array group in combination. For example, when the LDEV point of the logical device set in the array group 1 is equal to the LDEV point of the logical device set in the array group 2, the path is set on the logical device in the array group that has the smaller point.

Moreover, the volume judging module 605 can also judge based on the number of the logical devices set in the array group. For example, two logical devices are set in the array group 1, three logical devices are set in the array group 2, and the LDEV points of the logical devices in the array group 1 are equal to the LDEV points of the logical devices in the array group 2. In this case, the smaller number of logical devices set in the array group 1 are selected, and the path is set therein.

It should be noted that in another possible scheme, is that the logical device count of the logical devices set in the array group and the selection order of the logical devices are used in combination, the LDEV points are equal to one another, and the numbers of the logical devices organized in the array groups are the same, in which case the logical device discovered earliest is to be selected.

Figure 9:
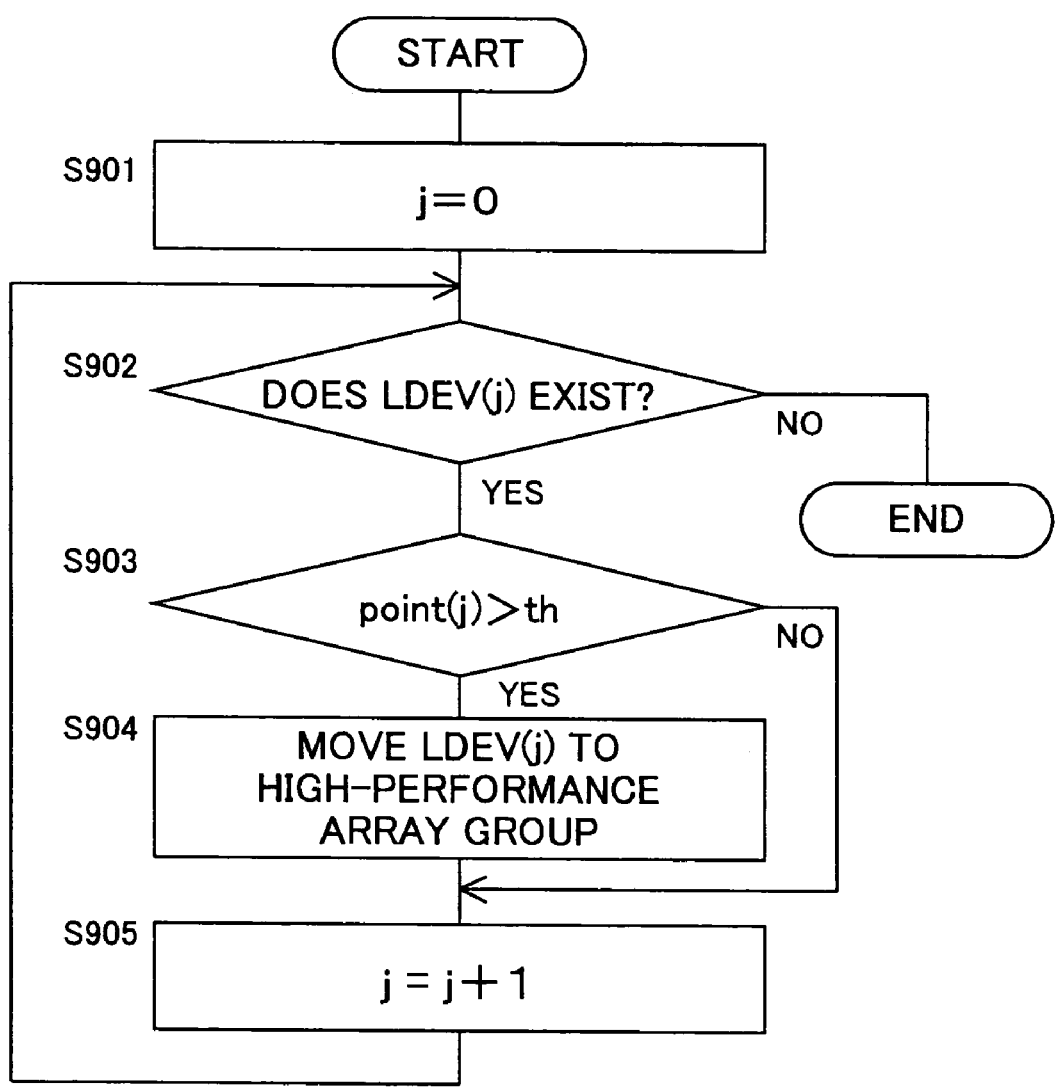
FIG. 9 is a flowchart of a process of moving the logical device according to the embodiment.

FIG. 9 is a flowchart of a process of moving the logical device, which is executed by the volume judging module 605.

To begin with, the volume judging module 605 executes initialization for setting the counter value j to an initial value "0" of the entry number 501 (S901).

Then, the volume judging module 605 judges whether the j-th logical device (LDEV(j)) exists (S902). If the j-th logical device (LDEV(j)) does not exist, this implies that the judgment as to whether every logical device is selected as a moving logical device has been finished, and therefore the volume judging module 605 terminates this process.

Then, the volume judging module 605 compares the LDEV point (point(j)) of the j-th logical device with a threshold value (th) (S903). It should be noted that the moving logical device may also be selected not by using the LDEV point evaluated for every logical device but by using data about the actual usage frequency of the logical device.

Subsequently, if the LDEV point (point(j)) of the j-th logical device is larger than the threshold value (th), the j-th logical device is moved to a high-performance array group (S904). On the other hand, if the LDEV point (point(j)) of the j-th logical device is not larger than the threshold value (th), the volume judging module 605 advances to the next step without moving the j-th logical device.

Thereafter, the volume judging module 605 adds "1" to the counter value j in order to judge whether a subsequent (j+1)th logical device is a moving device (S905).

Further, the present invention can be applied to a case of selecting a logical device in which new path is set as well as to the selection of the moving logical device. That is, the counter generation module 603 adds the LDEV point on the basis of the number of the logical paths set in the logical devices by use of the structure information acquired by the information acquisition module 601, subtracts the LDEV points based on the number of the communication counterpart devices set through the effective logical paths, and selects the logical device in which the new path is set.

As described above, according to the embodiment, the moving logical device is selected based on the number of the logical paths set in the logical devices and on the number of the communication counterpart devices set through the effective logical paths, and it is therefore possible to optimally allocate the physical devices by effectively exploiting a free area for the physical devices and to properly distribute loads of the physical devices.

Moreover, as the path setting target logical device is selected based on the number of the logical paths set in the logical devices and on the number of the communication counterpart devices set through the effective logical paths, it is feasible to optimally allocate the physical devices and to properly distribute the loads of the physical devices.

Furthermore, since the moving array group is selected based on the number of the logical paths set in the array group and on the number of the communication counterpart devices set through the effective logical paths, it is feasible to optimally allocate the array groups by moving the selected array group to the high-performance physical device and to properly distribute loads of the array groups.

Still further, when the change in the structure information of the storage system is detected, the moving logical device is selected based on the point of the logical device calculated based on the structure information related to the change, and therefore the dynamic load sharing can be attained based on the structure information of the storage system. It is possible to correspond to the change in the structure of the initialized storage system.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
   a storage system that includes a logical device logically set in a physical device;
   at least one host computer that requests the storage system for a data input/output; and
   a management device that manages information of components in the storage system,
   wherein the host computer requests a data input/output via a logical path as one of plurality of a communication paths with the logical device,
   wherein the at least one of the host computers is restricted to send the data input/output request to the logical device, and
   wherein the management device comprises:
   an information acquisition module that acquires the information of the components in the storage system, and
   a judging module that selects a logical device to move based on a number of logical paths set on logical devices and a number of communication counterpart devices set through effective logical paths in the information acquired by the information acquisition module.

2. The computer system according to claim 1, wherein the management device further comprises:
   an information analyzing module that analyzes the information of the components in the storage system acquired by the information acquisition module, and
   a counter generation module that calculates a point of the logical device based on a information of the components in the storage system analyzed result obtained by the information analyzing module,
   wherein the judging module selects the logical device to move based on a point of the logical device calculated by the counter generation module.

3. The computer system according to claim 2, wherein the counter generation module adds the point of the logical device based on the number of the logical paths set on the logical devices, and subtracts the point of the logical device based on the number of the communication counterpart devices set through the effective logical paths.

4. The computer system according to claim 1, wherein when the information acquisition module detects a change in the information of the components in the storage system, the judging module selects the logical device to move based on the point of the logical device calculated based on the information of the components changed.

5. The computer system according to claim 1, wherein the storage system further includes:
   an array group constructed by plural physical devices, and the judging module that selects a array group to move based on a number of the logical paths set on the array group and on the number of the communication counterpart devices set through the effective logical paths.

6. A computer system comprising:
   a storage system that includes a logical device logically set in a physical device;
   a host computer that requests the storage system for a data input/output; and
   a management device that manages information of components of the storage system,
   wherein the host computer requests a data input/output via a logical path as one of a plurality of communication paths with the logical device,
   wherein the host computer is restricted to send the data input/output request to the logical device, and
   wherein the management device comprises:
   an information acquisition module that acquires the information of components in the storage system, and
   a judging module that selects a logical device in which a new path is set based on a number of logical paths set on logical devices and a number of communication counterpart devices set through effective logical paths in the information acquired by the information acquisition module.

7. A management device communicatively connected to a storage system that includes a logical device logically set in a physical device and to a host computer that requests of the storage system to input/output data via plural logical paths as communication paths to the logical device, the management device managing information of components in the storage system, the management device, executes functions by processing means, comprising:
   an information acquisition function that acquires the information of the components in the storage system; and
   a judging function that selects a logical device to move based on a number of logical paths set on the logical devices and a number of communication counterpart devices set through effective logical paths in the information acquired by the information acquisition module.

8. The management device according to claim 7, further comprising:
   an information analyzing function that analyzes the information of the components in the storage system acquired by the information acquisition function; and
   a counter generation function that calculates a point of the logical device based on information of the components analysis result obtained by the information analyzing function,
   wherein the judging function selects the logical device to move based on the point of the logical device calculated by the counter generation function.

9. The management device according to claim 8, wherein the counter generation function adds the point of the logical device based on the number of the logical paths set on the logical devices, and subtracts the point of the logical device based on the number of the communication counterpart devices set through the effective logical paths.

10. The management device according to claim 7, wherein when the information acquisition function detects a change in the information of the components in the storage system, the judging function selects the logical device to move based on the point of the logical device calculated based on the information of the components changed.

11. The management device according to claim 7, wherein the judging function selects an array group to move based on a number of the logical paths set on an array group constructed by plural physical devices and based on the number of the communication counterpart devices set through the effective logical paths.

12. A management device communicatively connected to a storage system that includes a logical device logically set in a physical device and to a host computer that requests the storage system to input/output data via plural logical paths as a communication paths to the logical device, the management device managing structure information of the storage system, the management device, executes functions by processing means, comprising:

an information acquisition function that acquires the information of the components in the storage system; and a judging function that selects a logical device in which a new path is set based on a number of logical paths set on the logical devices and a number of communication counterpart devices set through effective logical paths in the information acquired by the information acquisition function.

13. A logical device selecting method for a logical device to move, performed by a management device communicatively connected to a storage system that includes a logical device logically set in a physical device and to a host computer that requests of the storage system to input/output data via plural logical paths as a communication paths to the logical device, the logical device selecting method, being executed by processincg means of said management device, comprising:

acquiring the information of the components in the storage system; and selecting the logical device to move based on a number of logical paths set on the logical devices and a number of communication counterpart devices set through effective logical paths in the information acquired by the information acquisition function.

14. The logical device selecting method according to claim 13, being executed by processing means of said management device, further comprising:

analyzing the acquired information of the components;

calculating the point of the logical device based on a information of the components analysis result; and selecting the logical device to move based on the calculated point of the logical device.

15. The logical device selecting method according to claim 14, being executed by processing means of said management device, further comprising:

adding the point of the logical device based on the number of the logical paths set on the logical devices;

subtracting the point of the logical device based on the number of the communication counterpart devices set through the effective logical paths; and calculating the point of the logical device.

16. The logical device selecting method according to claim 13, being executed by processing means of said management device, further comprising:

when the information acquisition module detects the change in the information of the components in the storage system, selecting the logical device to move based on the point of the logical device calculated based on the information of the components changed.

17. The logical device selecting method according to claim 13, being executed by processing means of said management device, further comprising:

selecting a array group to move based on a number of the logical paths set on an array group constructed by plural physical devices and on the number of the communication counterpart devices set through the effective logical paths.

18. A logical device selecting method for a logical device to move, performed by a management device communicatively connected to a storage system that includes a logical device logically set in a physical device and to a host computer that requests the storage system to input/output data via plural logical paths as communication paths to the logical device, the logical device selecting method, being executed by processing means of said management device, comprising:

acquiring the information of the components in the storage system; and selecting the logical device in which a new path is set based on a number of logical paths set on the logical devices and a number of communication counterpart devices set through effective logical paths in the structure information acquired by the information acquisition function.

19. A computer program, stored on a storage medium, for managing a storage device by a management device, the management device communicatively connected to a storage system that includes a logical device logically set in a physical device and to a host computer that requests of the storage system to input/output data via plural logical paths as a communication paths to the logical device, the computer program when executed causes processing means of the management device to perform the steps of:

acquiring the structure information of the storage system; and selecting a logical device to move based on a number of logical paths set on the logical devices and a number of communication counterpart devices set through effective logical paths.

20. The computer program according to claim 19, wherein the computer program when executed causes processing means of the management device to further perform the steps of:

analyzing the acquired information of the components;

calculating the point of the logical device based on a structure information of the components analysis result; and selecting the logical device to move based on the calculated point of the logical device.

21. The computer program according to claim 20, wherein the computer program when executed causes processing means of the management device to further perform the steps of:

adding the point of the logical device based on the number of the logical paths set on the logical devices, and subtracting the point of the logical device based on the number of the communication counterpart devices set through the effective logical paths.

22. The computer program according to claim 19, wherein the computer program when executed causes processing means of the management device to further perform the steps of:

selecting a array group to move based on a number of the logical paths set on an array group constructed by of plural physical devices and on the number of the communication counterpart devices set through the effective logical paths.

23. A computer program stored on a storage medium for managing a storage device by a management device, the management device communicatively connected to a storage system that includes a logical device logically set in a physical device and to a host computer that requests the storage system to input/output data via plural logical paths as a communication paths to the logical device, the computer program when executed causes processing means of the management device to perform the steps of:

acquiring the structure information of the storage system; and selecting a logical device in which a new path is set based on a number of logical paths set on the logical devices and a number of communication counterpart devices set through effective logical paths.

* * * * *